US010348789B2

(12) United States Patent
Gouache et al.

(10) Patent No.: US 10,348,789 B2
(45) Date of Patent: Jul. 9, 2019

(54) METHOD FOR RETRIEVING, BY A CLIENT TERMINAL, A CONTENT PART OF A MULTIMEDIA CONTENT (71) Applicant: INTERDIGITAL VC HOLDINGS, INC., Wilmington, DE (US)

(72) Inventors: Stephane Gouache, Cesson Sevigne (FR); Guillaume Bichot, La Chapelle Chaussee (FR); Francoise Le Bolzer, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 14/901,168

(22) PCT Filed: Jun. 13, 2014

(86) PCT No.: PCT/EP2014/062316
§ 371 (c)(1),
(2) Date: Dec. 28, 2015

(87) PCT Pub. No.: WO2014/206762
PCT Pub. Date: Dec. 31, 2014

(65) Prior Publication Data
US 2016/0156688 A1 Jun. 2, 2016

(30) Foreign Application Priority Data
Jun. 28, 2013 (EP) .................................. 13305908

(51) Int. Cl.
*G06F 13/00* (2006.01)
*H04L 29/06* (2006.01)
*H04L 29/08* (2006.01)

(52) U.S. Cl.
CPC ...... *H04L 65/4092* (2013.01); *H04L 65/4084* (2013.01); *H04L 65/605* (2013.01);
(Continued)

(58) Field of Classification Search
CPC . H04L 65/605; H04L 67/322; H04L 65/4084; H04L 67/02; H04L 65/80; H04L 67/2842; H04L 65/4092
(Continued)

(56) References Cited

U.S. PATENT DOCUMENTS 8,560,729 B2 * 10/2013 Jabri .................... H04L 65/605
370/352
8,812,621 B2 * 8/2014 Begen ................. H04L 65/1069
709/219
(Continued)

FOREIGN PATENT DOCUMENTS

JP 2005063192 3/2005
JP 2013517676 5/2013

OTHER PUBLICATIONS

Zeng, D. | Fei-Yue Wang | Mingkuan Liu, "Efficient web content delivery using proxy caching techniques", IEEE Transactions on Systems, Man and Cybernetics, Part C (Applications and Reviews) | vol. 34, No. 3 | 270-80, 270, IEEE, 445 Hoes Lane, Piscataway, NJ 08855 USA,,, Aug. 2004.
(Continued)

*Primary Examiner* — Kenneth R Coulter
(74) *Attorney, Agent, or Firm* — Joseph J. Opalach

(57) ABSTRACT

Method for retrieving, by a client terminal, a content part of a multimedia content, a cache being arranged along the transmission path between the client terminal and a server, several representations of said content part being available, comprising:

A/ sending a request for a first representation of said content part belonging to a set of allowable representations selected among said available representations of the content part;

B/ in case said first representation is not cached, receiving a response message from said cache indicating that the first representation is not cached;

(Continued)

and wherein, upon receipt of a response message, steps A/ and B/ are successively repeated with an alternative representation of said content part, different from the first representation, until one requested alternative representation has been received by the client terminal from said cache or until all allowable representations of the set have been requested.

14 Claims, 3 Drawing Sheets

(52) U.S. Cl.
CPC .............. *H04L 65/80* (2013.01); *H04L 67/02* (2013.01); *H04L 67/2842* (2013.01); *H04L 67/322* (2013.01)

(58) Field of Classification Search
USPC ........ 709/203, 238, 241, 217–219, 213–215, 709/232
See application file for complete search history.

(56) References Cited

U.S. PATENT DOCUMENTS

| | | | |
|---|---|---|---|
| 9,549,038 B1* | 1/2017 | Anne | .................. H04L 67/2842 |
| 2004/0098463 A1 | 5/2004 | Shen et al. | |
| 2008/0195761 A1* | 8/2008 | Jabri | ..................... H04L 65/605 709/250 |
| 2011/0296109 A1 | 12/2011 | Sood et al. | |
| 2012/0195362 A1 | 8/2012 | Benno et al. | |
| 2012/0284371 A1 | 11/2012 | Begen et al. | |
| 2012/0290644 A1 | 11/2012 | Gabin et al. | |
| 2017/0134219 A1* | 5/2017 | Taibi | ................... H04L 65/4084 |

OTHER PUBLICATIONS

Zheng Dongdong | Yu Hongliang | Zheng Weimin, "Segment-based adaptive proxy caching of multimedia streams", Journal of Tsinghua University (Science and Technology) | vol. 47, No. 7 | 1204-7, 1204, Tsinghua University Press, ,,, Jul. 2007.

Taeseok Kim | Hyokyung Bahn | Kern Koh, "Efficient cache management for QoS adaptive multimedia streaming services", Advances in Multimedia Information Processing—PCM 2005. 6th Pacific-Rim Conference on Multimedia. Proceedings, Part II (Lecture Notes in Computer Science vol. 3768),,,, "Advances in Multimedia Information Processing—PCM 2005. 6th Pacific-Rim Conference on Multimedia. Proceedings, Part II",, 2005.

Rejae Reza et al. -Multimedia Proxy Caching Mechanism for Quality Adaptive Streaming Applications in the Internet-http://mirage.cs.uoregon.edu/pub/infocom00.pdf, Mar. 26, 2000.

Sanchez et al. -Efficient Http-based streaming using Scalable Video Coding—http:iphome.hhi.de/wiegand/assetspdfs/HTTP-SVC.pdf, Oct. 8, 2011.

Wikipedia—Web Cache—http://fr.wikipedia.org/wiki/Cache-Control, Oct. 1, 2012.

Fielding R. et al. -Hypertext Transfer Protocol—HTTP/1.1—http://www.ietf.org/rfc/rfc2616.txt, Jun 1999.

Hong Dohy et al. -A chunk-based caching algorithm for streaming video—http://netcoop.ugent.be/slides/11devleeschauwer.pdf, May 31, 2011.

* cited by examiner

METHOD FOR RETRIEVING, BY A CLIENT TERMINAL, A CONTENT PART OF A MULTIMEDIA CONTENT

This application claims the benefit, under 35 U.S.C. § 365 of International Application PCT/EP2014/062316, filed Jun. 28, 2013, which was published in accordance with PCT Article 21(2) on Dec. 31, 2014 in English and which claims the benefit of European patent application No. 13305908.9, filed Jun. 28, 2013.

FIELD OF THE INVENTION

The present invention relates generally to the domain of the adaptive streaming technology over, for instance but not exclusively, HTTP (HyperText Transfer Protocol) and, in particular, to a method for retrieving, by a client terminal, a content part of a multimedia content, a cache being arranged along the transmission path between the client terminal and a remote server.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Adaptive streaming over HTTP (also called multi-bitrate switching) is quickly becoming a major technology for multimedia content distribution. Among the HTTP adaptive streaming protocols which are already used, the most famous are the HTTP Live Streaming (HLS) from Apple, the Silverlight Smooth Streaming (SSS) from Microsoft, the Adobe Dynamic Streaming (ADS) from Adobe and the Dynamic Adaptive Streaming over HTTP (DASH) developped by 3GPP within the SA4 group.

When a client terminal wishes to play an audiovisual content (or A/V content) in adaptive streaming, it first has to get a file describing how this A/V content might be obtained. This is generally done through the HTTP protocol by getting a describing file, so-called manifest, from an URL (Uniform Resource Locator), but can be also achieved by other means (e.g. broadcast, e-mail, SMS and so on). The manifest basically lists the available representations (also called instances or versions) of such an A/V content (in terms of bitrate, resolution and other properties); one representation per quality level (bitrate). Each representation is made of a series of chunks of equal duration—accessible by a separate URL—and has a set of descriptive elements attached for selection by the client. Said manifest is generated in advance and delivered to the client terminal by, for instance, a remote server.

Indeed, the stream of data corresponding to the A/V content is available on an HTTP server with different qualities. The highest quality is associated with a high bitrate; the lowest quality is associated with a low bitrate. This allows distribution to many different terminals which might be subject to highly varying network conditions.

The whole data stream of each representation is divided into chunks of equal duration which are made such that a client terminal may smoothly switch from one quality level to another between two chunks. As a result, the video quality may vary while playing but rarely suffers from interruptions (also called freezes).

At the client side, the chunks are selected based on a measure of the available bandwidth of the transmission path. In particular, a client terminal usually requests the representation of a chunk corresponding to a bitrate encoding and thus a quality compliant with the measured bandwidth.

When a cache is along the transmission path between a client terminal and a remote server which frequently occurs, one representation of a given chunk may already be stored in said cache, in case another client has previously requested the same chunk with the same representation or in case a Content Delivery Network (CDN) has already provisioned the chunk in the cache. Thus, the response to an HTTP request for said given chunk is faster than if the chunk comes from the remote server and duplicate transmission can be avoided, effectively saving network resources.

Nevertheless, the HTTP adaptive streaming appears not to be cache friendly (or at least less cache friendly than the so called layered base switching as for instance H264-SVC). Indeed, if a first client terminal requests a representation r of a given chunk and a second client terminal—sharing a part of the transmission path with said first client terminal and a cache—requests a representation r' of said given chunk (at a higher or lower quality), then the cache is not hit leading to higher load on the network segment between the cache and the server with the risk of causing congestion. The benefits of caching are then completely annihilated and caches are currently unable to improve this situation.

The present invention focuses on preventing network congestions and, in particular, attempts to operate caches possibly located along the transmission path between a client terminal and one or several remote servers.

SUMMARY OF THE INVENTION

The invention concerns a method for retrieving, by a client terminal, a content part of a multimedia content, a cache being arranged along the transmission path between the client terminal and a server, several representations of said content part being available,
which is remarkable in that it comprises:
A/ sending a request for a first representation of said content part belonging to a set of allowable representations selected among said available representations of the content part;
B/ in case said first representation is not cached, receiving a response message from said cache indicating that the first representation is not cached;
and wherein, upon receipt of a response message, steps A/ and B/ are successively repeated with an alternative representation of said content part, different from the first representation, until one requested alternative representation has been received by the client terminal from said cache or until all allowable representations of the set have been requested.

Thus, thanks to the present invention, it is possible to decrease the end-to-end traffic between a client terminal (i.e. an HTTP adaptive streaming client terminal) and the corresponding origin server by means of caching, that aims at increasing the number of cache hits. To this end, the client terminal can be configured to attempt to fetch in priority a representation already stored in a cache along the transmission path. It could then lead to less traffic between the client terminal and the original server and, as a consequence, less congestion. Thus, the present invention can provide a better user experience to the end user, as limiting the need to download chunk from the server.

According to a preferred embodiment compliant with the invention, the alternative representation has a corresponding bitrate lower than the one of the first representation. As a variant or as a complement, the bitrate of the alternative representation might be higher than the one of the first representation.

Besides, according to said preferred embodiment, the method comprises a further step of estimating the bandwidth along the transmission path between the client terminal and the remote server.

In addition, each allowable representation of the set has preferably a corresponding bitrate at most equal to the estimated bandwidth.

Advantageously, the bitrate of the preferred representation is just below the estimated bandwidth.

In a further aspect of the invention, within the determined set of allowable representations, the representations can be advantageously listed in order of preference, for instance in decreasing order from the higher bitrate to the lower bitrate.

According to the preferred embodiment, said request advantageously comprises at least one directive, such that the cache returns the requested representation if cached or said response message in case the first representation is not cached.

In particular, if the transmission protocol used is HTTP, the request is an HTTP request and the Cache Control header of said HTTP request can comprise the directive "only_if_cached". It is obvious that other directives could be used alternatively to carry the same meaning to the cache.

As a variant or as complement compliant with the present invention, said request further can comprise one additional directive, configured to provide, in order of preference, alternative representations of the determined set which might be requested by the client terminal in case the first representation is not cached, so that the cache checks whether an alternative representation of said list is cached or not before sending a response message.

In addition, if the transmission protocol used being HTTP, said additional directive can be included within the cache control header of said HTTP request.

Furthermore, the present invention also concerns a terminal configured to retrieve a content part of a multimedia content, a cache being arranged along the transmission path between said terminal and a server, several representations of said content part being available.

According to the present invention, said terminal comprises a module configured:
  to send a request for a first representation of said content part belonging to a determined set of allowable representations; and
  to receive, in case said first representation is not cached, a response message from said cache indicating that the first representation is not cached,
so that, upon receipt of a response message from the cache, said module sends at least one new request for an alternative representation of said content part, different from the first representation, until one requested alternative representation has been received by the client terminal from said cache or until all allowable representations of the set have been requested.

Moreover, said terminal may additionally comprise a selection module configured for determining the set of allowable representations the terminal might request, among said available representations of the content part.

In addition, said request advantageously comprises at least one directive, such that the cache returns the requested representation if cached or said response message in case the first representation is not cached.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which.

Figure 1:
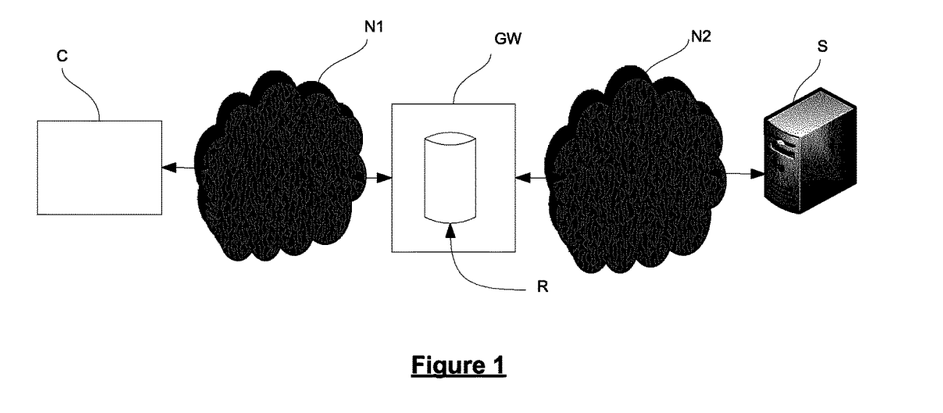
FIG. 1 is a schematic diagram of a Client-Server network architecture wherein the present invention might be implemented.
Figure 2:
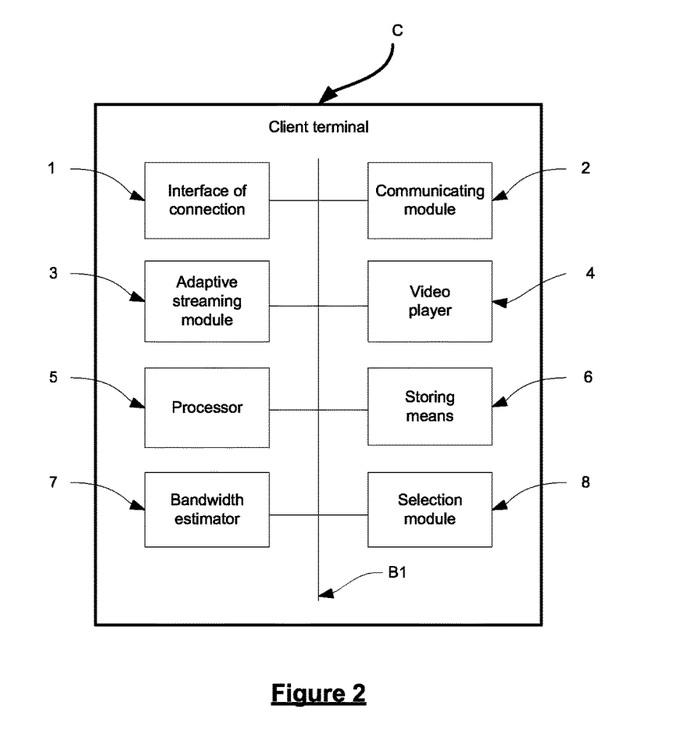
FIG. 2 is a block diagram of an example of a client terminal according to a preferred embodiment of the present invention.

In FIGS. 1 and 2, the represented blocks are purely functional entities, which do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

According to a preferred embodiment, the present invention is depicted with regard to the HTTP adaptive streaming protocol. Naturally, the invention is not restricted to such a particular environment and other adaptive streaming protocol could of course be considered and implemented.

As depicted in FIG. 1, the Client-Server network architecture, wherein the present invention might be implemented, comprises a client terminal C, a gateway GW and one or more HTTP servers S (only one is represented on FIG. 1).

The client terminal C—connected to the gateway GW through a first network N1 (such as a home network or an enterprise network)—may wish to request a multimedia content stored on a remote server S through a second network N2 (such as the Internet network). The first network N1 is connected to the second network N2 thanks to the gateway GW.

The HTTP server S streams chunks to the client terminal C, upon the client request, using HTTP adaptive streaming protocol over one or more TCP/IP connections.

According to the preferred embodiment as described in FIG. 2, the client terminal C comprises at least:
- an interface of connection 1 (wired and/or wireless, as for example Wi-Fi, Ethernet, etc.) to the first network N1;
- a communication module 2 containing the protocol stacks to communicate with the HTTP server S. In particular, the communication module 2 comprises the TCP/IP stack well known in the art. Of course, it could be any other type of network and/or communicating means enabling the client terminal C to communicate with the HTTP server S;
- an adaptive streaming module 3 which receives the HTTP streaming multimedia content from the HTTP server S. It continually selects the representation of a chunk whose the corresponding bitrate better matches constraints as described hereinafter;
- a video player 4 adapted to decode and render the multimedia content;
- one or more processor(s) 5 for executing the applications and programs stored in a non-volatile memory of the client terminal C;
- storing means 6, such as a volatile memory, for buffering the chunks received from the HTTP server S before their transmission to the video player 4;
- an internal bus B1 to connect the various modules and all means well known to the skilled in the art for performing the generic client terminal functionalities.

As an example, the client terminal C is a portable media device, a mobile phone, a tablet or a laptop. Naturally, the client terminal C might not comprise a complete video player, but only some sub-elements such as the ones for demultiplexing and decoding the media content to the end user. In this case, the client terminal C is a HTTP Adaptive Streaming (HAS) capable video decoder, such as a set-top box.

According to the preferred embodiment as described in FIG. 1, the gateway GW comprises a cache R, which is arranged along the transmission path between the client terminal C and a server S. In a variant, said cache R might be arranged in a proxy of the first network N1 or in any other location along the transmission path.

In the following, it is assumed that the client terminal C requests an HTTP Adaptive Streaming (HAS) multimedia content to the remote server S, said HAS multimedia content being available in several representations made of a series of chunks. The quality of each representation should be understood as related to media encoding quality, media encoding type (e.g. 2D versus 3D), media encoding color scheme, etc. . . . .

To this end, as shown in FIG. 2, the client terminal C further comprises:
- a bandwidth estimator 7 configured for estimating the bandwidth of the transmission path;
- a selection module 8 configured for determining a set of allowable representations the client terminal C might request. The allowable representations are selected among the available representations of a given chunk $I_n$ of the multimedia content, as listed in the associated manifest. In particular, the determination—by the module 8—of the set of allowable representations of the given chunk $I_n$ can be based on one or several performance criteria as for instance:
  - the bandwidth estimated by the estimator 7;
  - the capabilities of the client terminal C;
  - the representation of the previously requested chunk $I_{n-1}$;
  - the quality of experience required by an end user of the client terminal C.

Obviously, the selection module 8 might be, in a variant, integrated within the adaptive streaming module 3. It might be appreciated that the meaning of <<allowable>> representations depends on the implementation. Indeed, it may mean upgraded or downgraded quality representations of a given chunk $I_n$ by comparison with the representation of the previously requested chunk $I_{n-1}$.

If the requested representation of a given chunk $I_n$ has a corresponding quality significantly lower (i.e. visible by an end user) than the one of the representation of the previously requested chunk $I_{n-1}$, the selection module 8 might be configured not to attempt to further downgrade the quality in operating potential cached chunk, except if constrained by the available bandwidth.

In an illustrative but non-limitative example compliant with the present invention, the allowable representations of a given chunk $I_n$ (selected from the available representations listed in the manifest) have a corresponding bitrate (related to a given quality) at most equal to the estimated bandwidth. In addition, the bitrate of allowable representations of the set might also be at least equal to a defined threshold, under which quality is not acceptable by an end user of the client terminal C.

Obviously, as a variant or as a complement, the determined set of allowable representations can comprise one or more representations with a bitrate higher than the estimated bandwidth, in order to try to fetch a representation already stored in the cache R.

Besides, the adaptive streaming module 3 is configured to request a first representation r (also called preferred representation) of a given chunk $I_n$ of the HAS multimedia content, from the set of allowable representations. For instance, the first representation r of the chunk $I_n$ might correspond to the representation having an associated bitrate just lower than the estimated bandwidth.

Figure 3A:
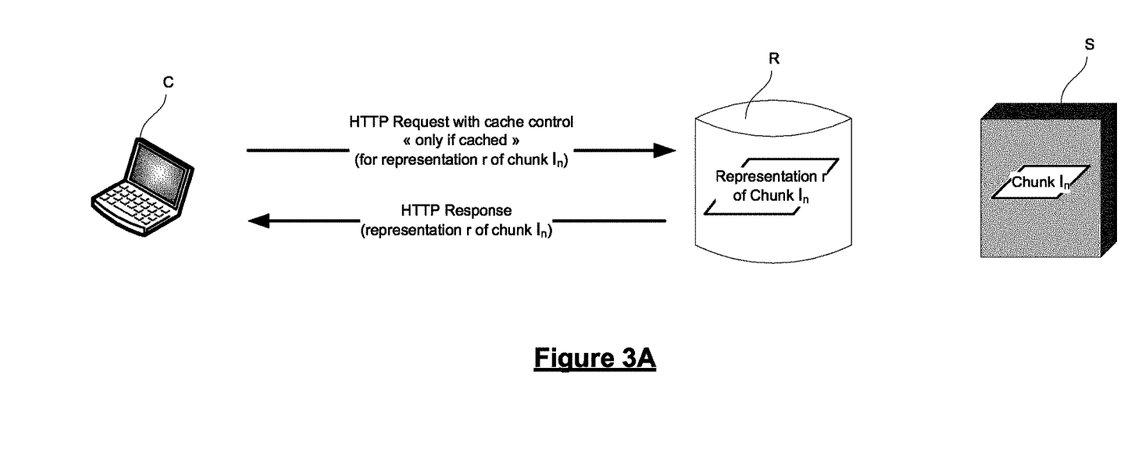
FIGS. 3A and 3B show HTTP request and response exchanged between the client terminal of FIG. 2 and a cache located along a transmission path, in case a requested representation of a given chunk is cached (FIG. 3A) and not cached in said cache (FIG. 3B)

To this end, the communication module 2 sends an HTTP request wherein, for instance, the Cache Control extension of its header comprises the directive "only_if_cached". Hereinafter is an example of such an HTTP request:
GET /hi/fileSequence2681.ts HTTP/1.1
Host:example.com
Cache_Control:only_if_cached Thus, as illustrated on FIGS. 3A and 3B, by parsing the directive "only_if_cached", the cache R should return either the first representation r if cached (see FIG. 3A), or an error message $M_{err}$ as a response (see FIG. 3B).

Figure 3B:
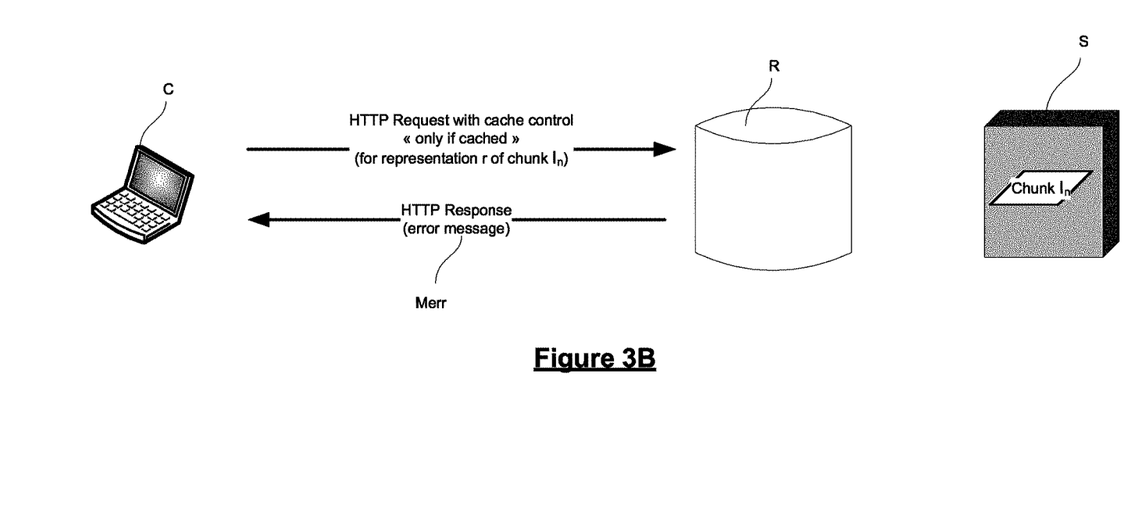

In the preferred embodiment, upon receipt of an error message $M_{err}$ from the cache R (i.e. the first representation r is not cached) by the client terminal C, the adaptive streaming module 3 requests an alternative representation r' from the determined set of representations. Said alternative representation r' has preferably a bitrate just lower than the one of the first representation r.

A new request, similar to the one used to get the first representation r, is then sent by the communication module 2 and intercepted by the cache R which checks whether or not it contains this alternative representation r'.

Likewise, when said alternative representation r' is not cached, an error message $M_{err}$ is sent to the client terminal C. In case said alternative representation r' is cached, the cache R returns the alternative representation r' to the client terminal C.

According to said preferred embodiment, in case the first representation r of the given chunk $I_n$ is not cached, the client terminal C tries successively to download, from said cache R, each of the alternative representations r' by order of decreasing quality, until cache R provides the requested representation or in case all allowable representations of the set have been requested.

When none of the allowable representations is cached, the client terminal C requests again a representation of the given chunk $I_n$ from the remote server S, for instance the first representation r which has a bitrate just below the estimated bandwidth. To this end, a new HTTP request is sent by the client terminal C to the server S, without the directive "only_if_cached" in the Cache Control extension of the header.

Figure 4:
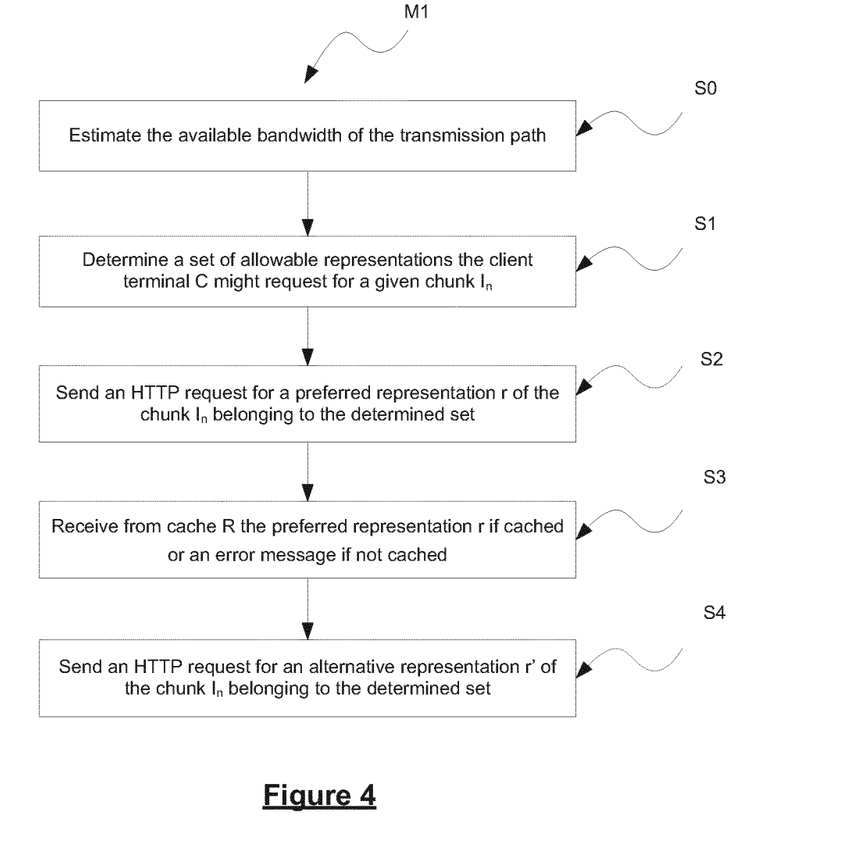
FIG. 4 is a flow chart illustrating the method for retrieving a representation of a given chunk, implemented by the client terminal of FIG. 2.

As illustrated in FIG. 4, according to said preferred embodiment, the client terminal C is configured to implement the following mechanism M1 for retrieving a given chunk $I_n$, said mechanism M1 comprising the steps of:
estimating (step S0) the available bandwidth along the transmission path between the client terminal C and a remote server S;
determining (step S1) a set of allowable representations selected from the available representations of the given chunk $I_n$;
sending (step S2) an HTTP request for a first representation r of the chunk $I_n$ having preferably a bitrate strictly lower than the estimated bandwidth;
receiving (step S3) from a cache R:
the first representation r if cached (see FIG. 3A), or
an error message $M_{err}$ in case said first representation r is not cached (see FIG. 3B).
sending (step S4) an HTTP request for an alternative representation r' of the chunk $I_n$ which belongs to the determined set of allowable representation, upon receipt of an error message $M_{err}$ from said cache R. The alternative representation r' differs from the previously requested representation r.

Upon receipt of an error message $M_{err}$, step S4 is repeated until one alternative representation r' has been returned to the client terminal C from said cache R or until all allowable representations of the set have been requested without success.

Besides, in a variant of the preferred embodiment, instead of determining a set of allowable representations (step S1), the client terminal C could successively request any available representations listed in the corresponding manifest (even the ones having an associated bitrate higher than the estimated bandwidth)—in order of preference (for instance, but not exclusively, from the higher to the lower bitrate)—to try to fetch a representation already stored in the cache R.

In a further variant of the preferred embodiment, the Cache Control extension of an HTTP request header, sent by the client terminal C, might further comprise an additional directive, named "altlist". This additional directive "altlist" allows the client terminal C to list, in order of preference or priority, alternative representations r' that can be returned by cache R in case a first representation r is not cached. Hereinafter is an example of such an HTTP request:
GET /hi/fileSequence2681.ts HTTP/1.1
Host: example.com
Cache_Control:only_if_cached,altlist=http:// example.com/med/fileSequence268 1.ts,http://example.com/low/fileSequence2681.ts The alternative representations r' of the "altlist" directive might correspond to the allowable representations of the determined set. Obviously, additional representations (for instance, having a bitrate higher than the estimated bandwidth) might be added.

It should be noticed that the "altlist" directive only works when the cache R is configured to support it (such a cache is called "smart" cache). In this latter case, the "altlist" directive has priority over the "only_if_cached" directive of the Cache Control header. A cache unable to interpret the "altlist" directive is named "legacy" cache.

Thus, by considering the cache R as a smart cache, upon receipt of such an HTTP request (including both directives "only_if_cached" and "altlist") for a first representation r of a given chunk $I_n$, the smart cache R checks whether said first representation r is cached. If cached, the smart cache R returns the first representation r to the client terminal C. If not cached, it browses the "altlist" directive to successively checks, by order of preference, whether or not one alternative representation r' is cached.

When such an alternative representation r' of the "altlist" directive is cached, the smart cache R returns said alternative representation r' to the client terminal C.

In case none of the alternative representations r' of the "altlist directive" is cached, the smart cache R is configured to return an error message $M_{err}$ (for instance "HTTP/1.1 504 altlist_supported") both indicating that:
the first representation r is not cached;
the cache R supports the "altlist" directive, so that it can be derived from the receipt of such an error message $M_{err}$ that none of the alternative representations r' of the "altlist" directive is cached.

In a further step, the client terminal C sends a new request to the remote server S to retrieve the first representation r of the given chunk $I_n$, directly from the server S. To this end, neither the "only_if_cached" directive, nor the "altlist" directive is used in the header of this new request.

Besides, by considering that the cache R is a legacy cache (it does not support the "altlist" directive), upon receipt of an HTTP request (including the "only_if_cached" and "altlist" directives) for a first representation r of a given chunk $I_n$, the legacy cache R checks whether said first representation r is cached.

If cached, the legacy cache R returns the first representation r to the client terminal C. If not cached, the legacy cache R is not able to browse the "altlist" directive and returns an error message $M_{err}$ (for instance "HTTP/1.1 504 Gateway_timeout").

Upon receipt of such an error message $M_{err}$, the client terminal C understands, on one hand, that the legacy cache R does not have the first representation r and, on another hand, that the legacy cache R does not support the "altlist" directive. In other words, it can be used by the client terminal to detect the presence of a legacy cache R.

Then, in a further step, the client terminal C might then proceed with the mechanism M1 as previously described in relation to FIG. 4 or, in a variant, might send a new request to the remote server S to retrieve the first representation r of the given chunk $I_n$ without the "only_if_cached" and "altlist'" directives.

In a further variant of the present invention, the Cache Control extension of an HTTP request header, sent by the client terminal C can only comprise the "altlist" directive without the "only_if_cached" directive. Hereinafter is an example of such an HTTP request:
GET /hi/fileSequence2681.ts HTTP/1.1
Host: example.com Cache_Control:altlist=http://example.com/med/
fileSequence2681.ts,http://example.com/low/
fileSequence2681.ts By considering a smart cache R, upon receipt of such an HTTP request for a first representation r of a given chunk $I_n$, the smart cache R checks whether said first representation r is cached.

If cached, the smart cache R returns the first representation r to the client terminal C. If not cached, it browses the "altlist" directive to successively checks, in order of preference, whether or not one alternative representation r' is cached.

When such an alternative representation r' of the "altlist" directive is cached, the smart cache R returns said alternative representation r' to the client terminal C.

In case none of the alternative representations r' of the "altlist directive" is cached, the smart cache R releases the HTTP request sent by the client terminal C towards the server S.

The released HTTP request might then be intercepted by a next cache along the transmission path between the previous smart cache R and the remote server S, so that, if said next cache is a smart cache, it behaves as the previous smart cache R. Otherwise (the next cache is a legacy cache), it might return an error message $M_{err}$ or might release the HTTP request towards the server S.

Moreover, it might be appreciated that the present invention (and in particular the mechanism M1) might be implemented in a dedicated client proxy device (for instance a home gateway). Thus, a client terminal operated by an end user can be unchanged (namely it submits HTTP request in a conventional way without taking care of caching) and the proxy device can implement mechanism M1 and therefore can operate cache directives as previously depicted.

References disclosed in the description, the claims and the drawings may be provided independently or in any appropriate combination. Features may, where appropriate, be implemented in hardware, software, or a combination of the two.

Reference numerals appearing in the claims are by way of illustration only and shall have no limiting effect on the scope of the claims.

This invention having been described in its preferred embodiment, it is clear that it is susceptible to numerous modifications and embodiments within the ability of those skilled in the art and without the exercise of the inventive faculty. Accordingly, the scope of the invention is defined by the scope of the following claims.

In the claims hereof, any element expressed as a means for performing a specified function (e.g. adaptive streaming module 3, bandwidth estimator 7, selection module 8, etc.) is intended to encompass any way of performing that function including, for example, a) a combination of circuit elements (for instance one or more processors) that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

The invention claimed is:

1. A method for retrieving, by a client terminal, a content part of a multimedia content, a cache being configured to be arranged along a transmission path between the client terminal and a server, several representations of said content part being available, comprising:

A/ sending a request for a first representation of said content part belonging to a set of allowable representations selected, by said client terminal, from among said available representations of the content part;

B/ in case said first representation of the request is not cached, receiving a response message from said cache indicating that the first representation is not cached by said cache; and wherein, upon receipt of said response message, steps A/ and B/ are successively repeated with an alternative representation of said content part, different from the first representation and having a corresponding bitrate lower than the one of the first representation, until one requested of said alternative representation has been received by the client terminal from said cache or until all allowable representations of the set have been requested, enabling a video player of said client terminal to render said multimedia content.

2. The method according to claim 1, comprising a further step of estimating the bandwidth along the transmission path between the client terminal and the remote server.

3. The method according to claim 2, wherein each allowable representation of the set has a corresponding bitrate at most equal to the estimated bandwidth.

4. The method according to claim 1, wherein said request comprises at least one directive, such that the cache returns the requested representation if cached or said response message in case the first representation is not cached.

5. The method according to claim 4, wherein said request further comprises one additional directive, configured to provide, in order of preference, said alternative representations of the determined set which might be requested by the client terminal in case the first representation is not cached, so that the cache checks whether one of said alternative representation of said list is cached or not before sending a response message.

6. The method according to claim 4, wherein, the transmission protocol used being HTTP, the request is an HTTP request and a Cache Control header of said HTTP request comprises the directive "only_if_cached".

7. The method according to claim 5, wherein said additional directive is included within the cache control header of said HTTP request.

8. A terminal configured to retrieve a content part of a multimedia content, a cache being configured to be arranged along a transmission path between said terminal and a server, several representations of said content part being available, characterized in that it comprises a module configured:

to send a request for a first representation of said content part belonging to a determined set of allowable representations; and to receive, in case said first representation of the request is not cached, a response message from said cache indicating that the first representation is not cached by said cache, so that, upon receipt of said response message from the cache, said module sends at least one new request for an alternative representation of said content part, different from the first representation and having a corresponding bitrate lower than the one of the first representation, until one requested of said alternative representation has been received by the client terminal from said cache or until all allowable representations of the set have been requested, enabling a video player of said client terminal to render said multimedia content.

9. The terminal according to claim 8, further comprising a selection module configured for determining the set of allowable representations the terminal might request, among said available representations of the content part.

10. The terminal according to claim 8, wherein said request comprises at least one directive, such that the cache returns the requested representation if cached or said response message in case the first representation is not cached.

11. The terminal according to claim 8, wherein each allowable representation of the set has a corresponding bitrate at most equal to an estimated bandwidth.

12. The terminal according to claim 8, wherein said request further comprises one additional directive, configured to provide, in order of preference, said alternative representations of the determined set which might be requested by the client terminal in case the first representation is not cached, so that the cache checks whether one of said alternative representation of said list is cached or not before sending a response message.

13. The terminal according to claim 8, wherein, the transmission protocol used being HTTP, the request is an HTTP request and a Cache Control header of said HTTP request comprises the directive "only_if_cached".

14. A cache configured to be arranged along a transmission path between a terminal configured to retrieve a content part of a multimedia content and a server, several representations of said content part being available, the cache comprising:
one or more processors configured to:
to receive from the terminal a request for a first representation of said content part belonging to a determined set of allowable representations; and
to send, in case said first representation of the request is not cached, a response message to the terminal indicating that the first representation is not cached,
and wherein the cache is further configured to receive at least one new request for an alternative representation of said content part, different from the first representation and having a corresponding bitrate lower than the one of the first representation, until one requested of said alternative representation has been received by the client terminal from said cache or until all allowable representations of the set have been requested, enabling a video player of said client terminal to render said multimedia content.

* * * * *